(12) United States Patent
Kahara et al.

(10) Patent No.: US 9,199,551 B2
(45) Date of Patent: Dec. 1, 2015

(54) LOCK DEVICE

(71) Applicant: KABUSHIKI KAISHA TOKAI RIKA DENKI SEISAKUSHO, Aichi (JP)

(72) Inventors: Keiji Kahara, Aichi (JP); Hiroshi Aoyama, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 72 days.

(21) Appl. No.: 14/096,595

(22) Filed: Dec. 4, 2013

(65) Prior Publication Data

US 2014/0170879 A1 Jun. 19, 2014

(30) Foreign Application Priority Data

Dec. 13, 2012 (JP) .................................. 2012-272498

(51) Int. Cl.
| | |
|---|---|
| *H01R 13/62* | (2006.01) |
| *B60L 15/20* | (2006.01) |
| *B60L 1/00* | (2006.01) |
| *B60L 11/14* | (2006.01) |
| *B60L 11/18* | (2006.01) |
| *B60K 15/05* | (2006.01) |
| *H01R 13/627* | (2006.01) |
| *H01R 13/639* | (2006.01) |

(52) U.S. Cl.
CPC ................. *B60L 15/20* (2013.01); *B60L 1/003* (2013.01); *B60L 11/14* (2013.01); *B60L 11/1805* (2013.01); *B60L 11/1818* (2013.01); *B60L 11/1846* (2013.01); *B60K 2015/0546* (2013.01); *B60K 2015/0561* (2013.01); *B60L 2230/12* (2013.01); *B60L 2240/28* (2013.01); *B60L 2240/42* (2013.01); *B60L 2250/16* (2013.01); *B60L 2250/20* (2013.01); *B60L 2260/22* (2013.01); *B60L 2270/32* (2013.01); *H01R 13/6275* (2013.01); *H01R 13/6397* (2013.01); *Y02T 10/7005* (2013.01); *Y02T 90/121* (2013.01); *Y10T 403/59* (2015.01)

(58) Field of Classification Search
CPC . H01H 15/005; H01H 15/5833; H01H 15/00; H01H 15/02; H01H 15/24; H01R 13/6397; B60L 11/1818; E05B 83/34; B60K 2015/0561; B60K 2015/0538; B60K 2015/0546; B60K 2015/0584; B60K 2015/0576; B60K 2015/0569
USPC ......... 439/188, 304; 200/51.07, 51.09, 51.05, 200/51.06; 70/244; 180/289; 292/144; 320/109

See application file for complete search history.

(56) References Cited

U.S. PATENT DOCUMENTS 8,616,909 B2    12/2013   Kurumizawa et al.
2009/0242291 A1*   10/2009   Sagawa et al. ........... 180/65.265

(Continued)

FOREIGN PATENT DOCUMENTS

JP         2009-081917       4/2009
WO    WO 2011120719 A1 * 10/2011

*Primary Examiner* — Felix O Figueroa
*Assistant Examiner* — Paul Baillargeon
(74) *Attorney, Agent, or Firm* — Greenblum & Bernstein, P.L.C.

(57) ABSTRACT

A lock device locks or unlocks a locking subject that relates to a power port and includes a lid. The lock device includes a detector that selectively generates a position detection signal at least corresponding to one of an open position where the lid is open, a closed position where the lid is closed, and a push position where the lid is pushed from the close position. A control unit controls locking or unlocking of the locking subject and a related device of the locking subject based on the position detection signal from the detector.

7 Claims, 8 Drawing Sheets

(56) References Cited

U.S. PATENT DOCUMENTS

2012/0238122 A1 9/2012 Hirashita et al.
2013/0015951 A1 1/2013 Kuramochi et al.
2013/0047687 A1 2/2013 Kurumizawa et al.
2013/0102163 A1* 4/2013 Basavarajappa et al. ....... 439/34
2013/0255333 A1 10/2013 Kurumizawa et al.
2013/0260597 A1 10/2013 Kurumizawa et al.

* cited by examiner

Switch 52a : OFF
Switch 52b : OFF

⇩

Switch 52a : ON
Switch 52b : OFF

⇩

Switch 52a : ON
Switch 52b : ON

LOCK DEVICE

CROSS-REFERENCE TO RELATED APPLICATIONS

This application is based upon and claims the benefit of priority from prior Japanese Patent Application No. 2012-272498, filed on Dec. 13, 2012, the entire contents of which are incorporated herein by reference.

BACKGROUND ART

The present invention relates to a lock device for locking and unlocking a locking subject.

Vehicles that emit less carbon dioxide, such as plugin hybrid vehicles and electric vehicles, are environment-friendly and have become popular. Such a vehicle is powered by a battery. When the battery drains after driving the vehicle over a long distance, the battery is recharged. Thus, the body of the vehicle is provided with a power port that is used to charge the battery. A charge cable of a charging facility is connected to the power port to supply power from the charging facility and charge the battery. The battery charging takes a long time. Thus, a charge cable lock device may be used to lock the charge cable to the vehicle body and prevent theft of the charge cable. Japanese Laid-Open Patent Publication No. 2009-081917 describes an example of such a charge cable lock device.

A lid opens and closes the power port. A switch may be used to open and close the lid. A further switch may be used to lock and unlock the charge cable. These switches take up space in the power port and increases costs.

SUMMARY OF THE INVENTION

One aspect of the present invention is a lock device for locking or unlocking a locking subject that relates to a power port and includes a lid. The lock device includes a detector that selectively generates a position detection signal at least corresponding to one of an open position where the lid is open, a closed position where the lid is closed, and a push position where the lid is pushed from the close position. A control unit controls locking or unlocking of the locking subject and a related device of the locking subject based on the position detection signal from the detector.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A lock device according to one embodiment of the present invention will now be described with reference to FIGS. 1 to 10.

Outline of Charge System

Figure 1:
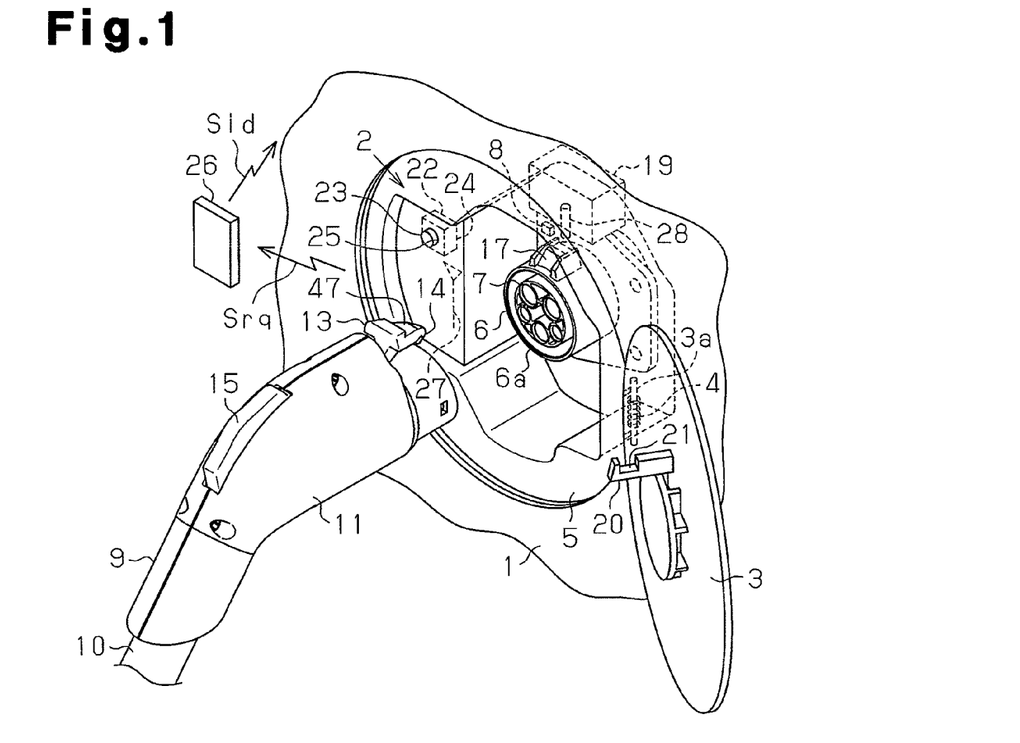
FIG. 1 is a perspective view showing a power port in one embodiment of the present invention.

Referring to FIG. 1, a vehicle such as a plugin hybrid vehicle includes a charge system that allows for a battery (not shown) of the vehicle to be charged by an external power supply installed in a household, charging station, or the like. The body 1 of the vehicle has a side wall including a power port 2. A lid 3 opens and closes the power port 2. The lid 3 is pivotal about a shaft 3a, which extends in the vertical direction. An urging member 4, such as a torsion spring, is arranged on the shaft 3a to urge the lid to an open position. An inlet 6, which serves as a power receiving connector, is arranged at the middle of a lid box 5 in the power port 2. The inlet 6 includes a cylindrical inlet case 6a. A terminal unit 7 is arranged in the inlet case 7a. A lighting unit 8 is arranged in the lid box 5 to emit light during the nighttime when the lid 3 is open. The lid 3 corresponds to a locking subject, and the lighting unit 8 corresponds to a related device.

Figure 2:
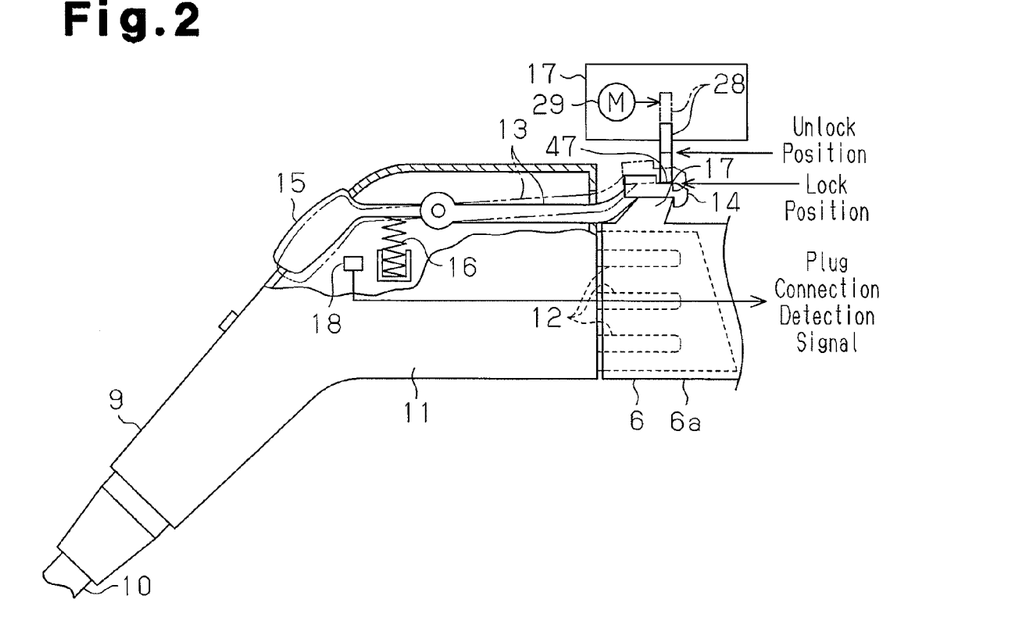
FIG. 2 is a diagram showing a charge cable connected to an inlet.

Referring to FIG. 2, a charge cable 9 extending from an external power supply is connectable to the inlet 6. The charge cable 9 includes a cable 10 and a power plug 11, which is arranged on the distal end of the cable 10. A terminal unit 12 is arranged in the distal end of the power plug 11 in correspondence with the terminal unit 7 of the inlet 6. A lock arm 13 is pivotally coupled to the power plug 11 to hold the power plug 11 on the inlet 6. The lock arm 13 includes a hook 14, which is arranged on the distal end of the lock arm 13, and an arm operation portion 15, which is arranged on the basal end of the lock arm 13. The hook 14 and the arm operation portion 15 are exposed to the exterior. An urging member 16 is arranged on the lock arm 13 near the arm operation portion 15 to constantly urge the lock arm 13 to a close position. The charge cable 9 corresponds to a locking subject.

When the power plug 11 is connected to the inlet 6, the power plug 11 is fitted straight to the inlet 6. The hook 14 comes into contact with an upper sloped surface of a catch 17 on the inlet case 7a. The sloped surface upwardly guides and pivots the hook 14 along the catch 17 against the urging force of the urging member 16. When the power plug 11 is fully fitted to the inlet 6, the urging force of the urging member 16 pivots the lock arm 13 to the close position. This hooks the hook 14 to the catch 17 so that the power plug 11 is held by the inlet 6.

A plug connection detector 18 is arranged in the power plug 11 to detect connection of the charge cable 9 to the inlet 6. When the charge cable 9 is connected to the inlet 6 and the hook 14 is hooked to the catch 17, the lock arm 13 is arranged at the close position. Thus, the plug connection detector 18 detects that the lock arm 13 is located at the close position and generates a plug connection detection signal, which indicates that the power plug 11 is connected to the inlet 6. The plug connection detector 18 then provides the generated plug connection detection signal to the vehicle body 1 via the terminal units 7 and 12. The plug connection detector 18 corresponds to a cable connection detector.

Structure of Lock Device

As shown in FIG. 1, the power port 2 includes a lock device 19 capable of locking either one of the lid 3 and the charge cable 9. In other words, the lock device 19 of the present example is of an integrated type that performs locking of the lid 3 and locking of the charge cable 9 with the same actuator. A striker 20 projects from a rear surface of the lid 3. The lock device 19 locks the lid 3 with the striker 20. An engagement groove 21 having a predetermined depth is formed in the distal end of the striker 20.

A push type operation switch 22 is arranged in the lid box 5. The operation switch 22 is operated, for example, when opening or closing the lid 3 and when locking and unlocking the charge cable 9. The operation switch 22 includes a button 23, which is movable back and forth, and a switch body 24, which supports the button 23 to be movable. In one example, the button 23 is cylindrical. The button 23 is exposed from the lid box 5 through a switch hole 25 extending through the lid box 5. The switch body 24 is arranged at the rear side of the lid box 5 and incorporates electric components such as contacts. The operation switch 22 corresponds to a detector.

The lid box 5 includes a transmission antenna 27, which is capable of transmitting radio waves to an electronic key 26 in compliance with an electronic key system that performs key verification through wireless communication. The electronic key system is, for example, an operation-free key system that performs ID verification through short-range wireless communication (communication distance of several meters), which is initiated by communication from the vehicle. When ID verification of the electronic key 26 is accomplished outside the vehicle (exterior smart verification), the locking or unlocking of the vehicle doors is performed or permitted. When ID verification of the electronic key 26 is accomplished inside the vehicle (interior smart verification), power activation of the vehicle is permitted. The transmission antenna 27 is used to check whether or not the electronic key 26 is located in the vicinity of the power port 2. Further, the transmission antenna 27 allows for the transmission of a smart verification request signal Srq to the vicinity of the power port 2 on radio waves in the low frequency (LF) band. Accomplishment of the smart verification initiated by the radio waves from the transmission antenna 27 may be used as one condition for permitting opening of the lid 3. The transmission antenna 27 corresponds to a related device.

As shown in FIG. 2, the lock device 19 includes a lock pin 28, which is engageable with the lid 3 or the power plug 11, and a lock motor 29, which functions as a drive source when moving the lock pin 28. The lock pin 28 is movable back and forth between a lock position and an unlock position. The lock device 19 is in a lock state (condition shown by the solid lines in FIG. 2) when the lock pin 28 is projected to the lock position and in an unlock state (condition shown by the single-dashed lines in FIG. 2) when the lock pin 28 is retracted to the unlock position. The lock pin 28 corresponds to a lock member, and the lock motor 29 corresponds to a related device (lid lock and charge cable lock).

Structure of Operation Switch

Figure 3:
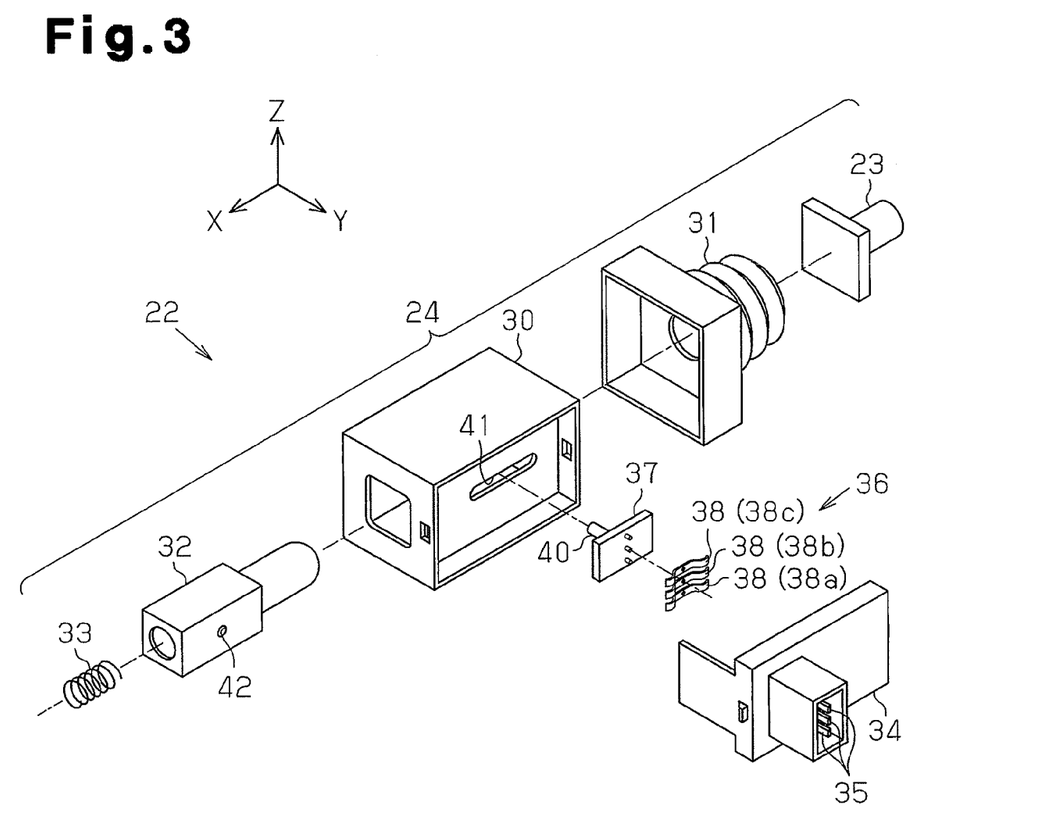
FIG. 3 is an exploded perspective view of an operation switch.

Referring to FIG. 3, the switch body 24 includes a case 30 and a boot 31, which is coupled to an end of the case 30. In one example, the case 30 is a hollow box, and the boot 31 is extendible. The case 30 accommodates a movable link 32, which is movable back and forth in the longitudinal direction (X axis direction in FIG. 3). An urging member 33, which is formed by, for example, a coil spring, constantly urges the movable link 32 toward the button 23. A connector 34 is integrally fixed to the case 30 by a snap-fit structure or the like for electric connection of the operation switch 22. The connector 34 includes a terminal unit 35 formed by a plurality of contact terminals.

Figure 4:
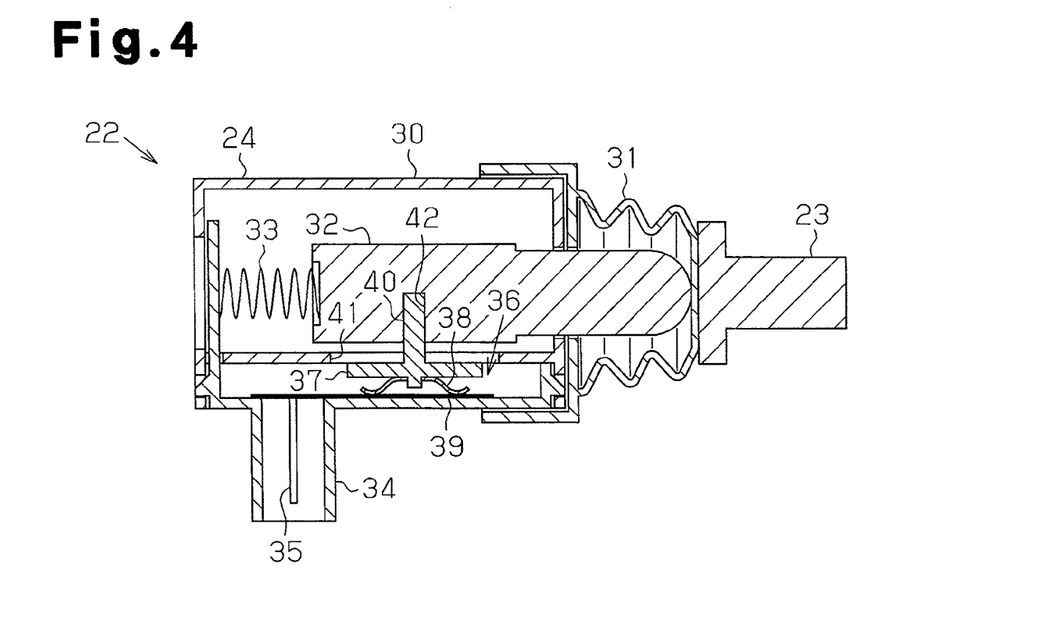
FIG. 4 is a cross-sectional view of the operational switch.

Referring to FIGS. 3 and 4, a slide contact unit 36 is arranged between the case 30 and the connector 34 to detect the position of the operation switch 22. The slide contact unit 36 includes movable contacts 38, which are coupled to a holder 37 that moves integrally with the movable link 32, and fixed contacts 39, which are fixed to the connector 34. An engagement pin 40 projects from a rear surface of the holder 37. The case 30 has a side wall including an elongated hole 41. The movable link 32 includes a pin socket 42. The engagement pin 40 is inserted through the elongated hole 41 and fixed to the pin socket 42. Thus, movement of the button 23 integrally moves the movable link 32, the holder 37, and the movable contacts 38 in the longitudinal direction of the elongated hole 41. The fixed contacts 39 are coupled to an inner surface of the connector 34 and electrically connected to the terminal unit 35.

Figure 5A:
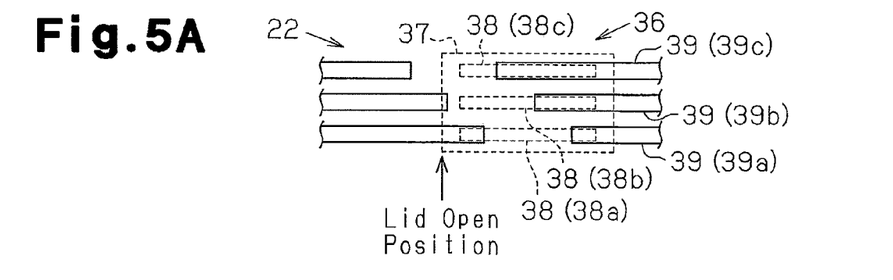
FIGS. 5A to 5C are schematic diagrams of the operation switch under different conditions.
Figure 5B:
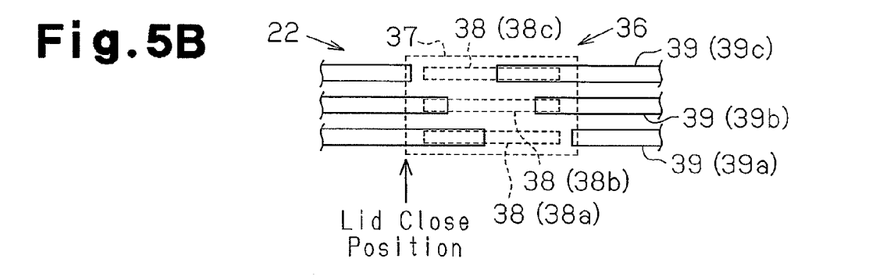
Figure 5C:
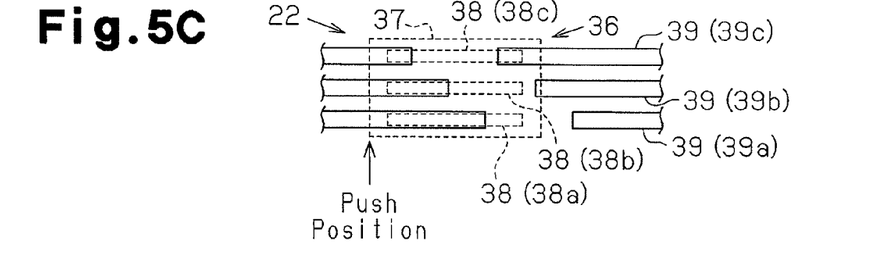

Referring to FIGS. 5A to 5C, the movable contacts 38 include a first movable contact 38a, a second movable contact 38b, and a third movable contact 38c, which are arranged next to one another. The fixed contacts 39 include a first fixed contact 39a, a second fixed contact 39b, and a third fixed contact 39c that are paired with the first movable contact 38a, the second movable contact 38b, and the third movable contact 38c, respectively. The three pairs of movable and fixed contacts are selectively connected as the holder 37 (button 23) moves.

When the lid 3 is located at the open position, that is, when the lid 3 opens the power port 2, the first movable contact 38a and the first fixed contact 39a are electrically connected (condition shown in FIG. 5A, operation switch 22 at OFF position). When the lid 3 is located at a close position, that is, when the lid 3 closes the power port 2, the second movable contact 38b and the second fixed contact 39b are electrically connected (condition shown in FIG. 5B, operation switch 22 at first ON position). When the lid 3 is located at a push position located further inward from the close position, that is, when the lid 3 is further pushed from the close position, the third movable contact 38c and the third fixed contact 39c are electrically connected (condition shown in FIG. 5C, operation switch 22 at second ON position).

Electrical Configuration of Lock Device

Figure 6:
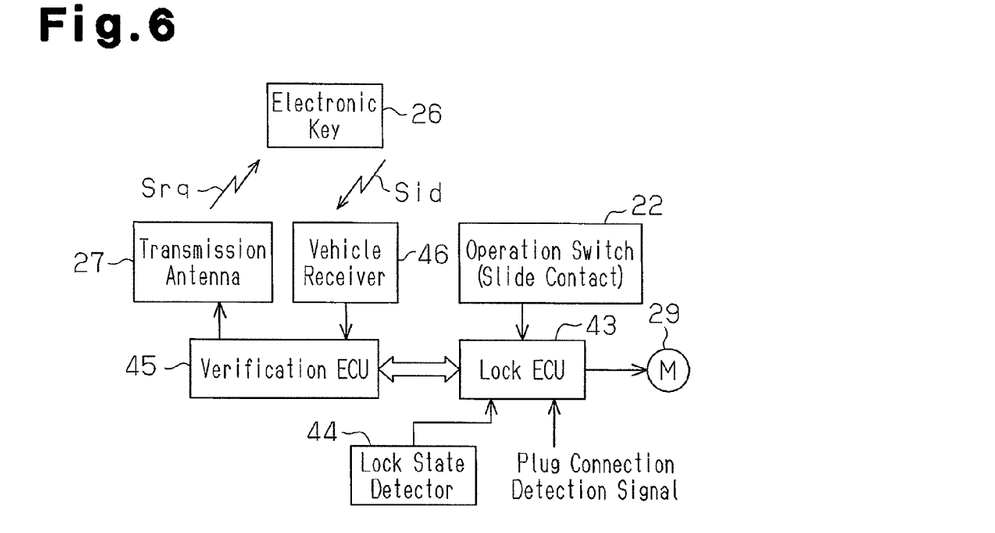
FIG. 6 is an electric diagram of the lock device.

Referring to FIG. 6, the lock device 19 includes a lock electronic control unit (ECU) 43 that controls the locking and unlocking operation of the lock device 19. The lock ECU 43 is connected to the operation switch 22 and the lock motor 29. Further, the lock ECU 43 receives plug connection detection signals. The lock ECU 43 is also connected to a lock state detector 44 that detects whether the lock device 19 is in a lock state or an unlock state. The lock state detector 44 may include, for example, a sensor arranged at each of the lock position and the unlock position of the lock pin 28 or an encoder that detects the direction and amount of the rotation produced by the lock motor 29. The lock ECU 43 corresponds to a control unit.

The lock ECU 43 is connected to a verification ECU 45 that performs verification in the electronic key system. The verification ECU 45 includes a memory (not shown). An ID code of the electronic key 26, which is registered to the vehicle, is written to and stored in the memory. The verification ECU 45 is connected to the transmission antenna 27 and a vehicle receiver 46, which is capable of receiving radio waves on the ultrahigh frequency (UHF). The verification ECU 45 performs smart verification at periodic or predetermined timings and provides the verification results to the lock ECU 43.

The operation of the lock device 19 in the present example will now be described with reference to FIGS. 7 to 10.

Lid Unlocking Operation

Figure 7:
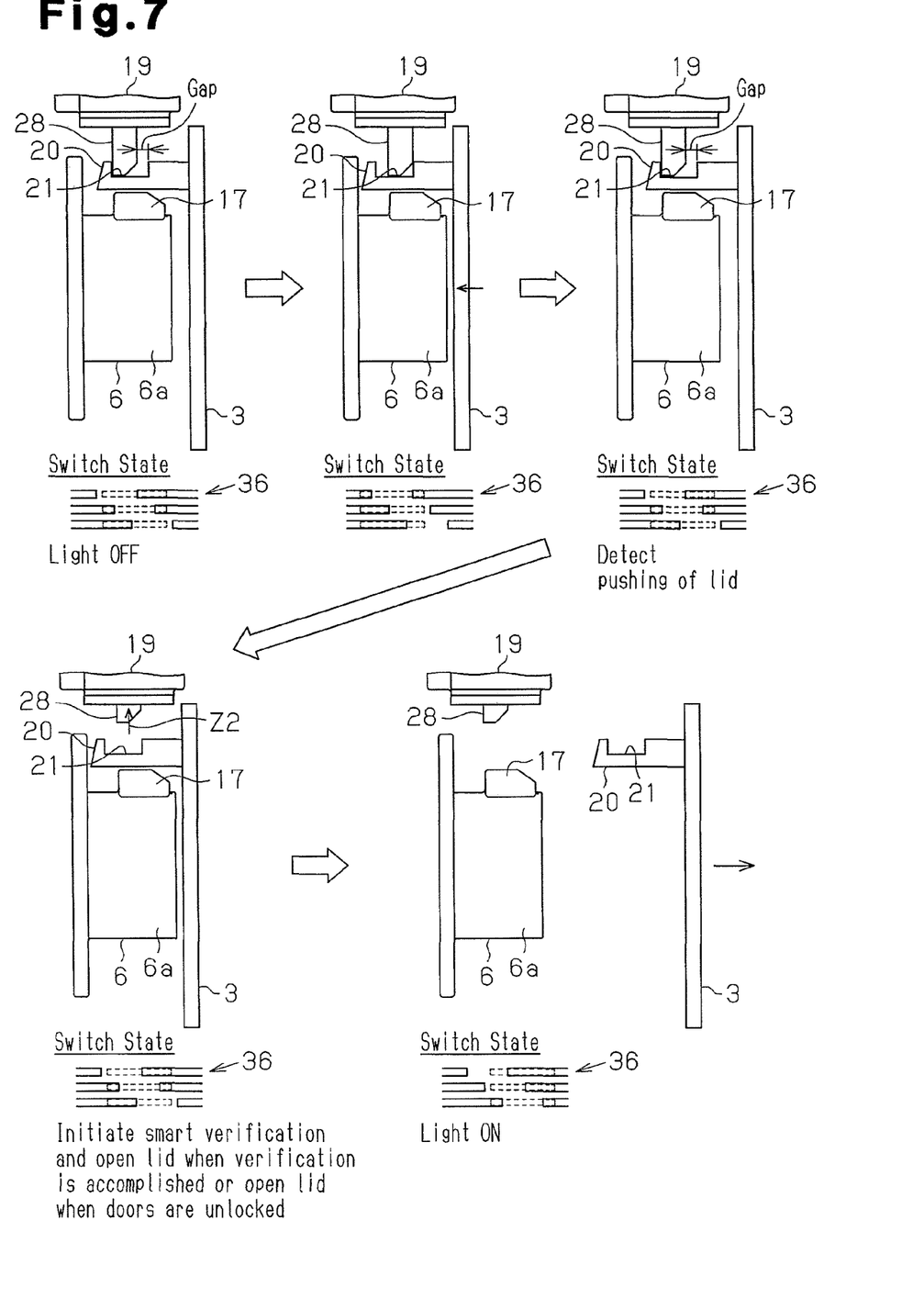
FIG. 7 is a schematic diagram illustrating the operation of the lock device when unlocking a lid.

Referring to FIG. 7, when the lid 3 is locked, the lock pin 28 is fitted to the engagement groove 21 of the striker 20. This fixes the lid 3 at the closed position. In this case, the operation switch 22 generates and provides the lock ECU 43 with a first ON position detection signal indicating that the operation switch 22 is located at the first ON position. When the lock ECU 43 receives the first ON position detection signal from the operation switch 22, the lock ECU 43 determines that the lid 3 is located at the close position and deactivates the lighting unit 8.

To open the lid 3, the user pushes the lid 3 from the close position and then releases the lid 3. In this case, the operation switch 22 is first located at the first ON position, then shifted to the second ON position, and finally returned to the first ON position. When the operation switch 22 is shifted to the second ON position, the operation switch 22 generates a second ON position detection signal to indicate that the operation switch 22 is located at the second ON position. In this manner, the operation switch 22 provides the lock ECU 43 with a first ON position detection signal, a second ON position detection signal, and a first ON position detection signal in this order. When the lock ECU 43 receives the first ON position detection signal, the second ON position detection signal, and the first ON position detection signal in this order, the lock ECU 43 determines that the lid 3 has been pushed. In this case, the lock ECU 43 starts the transmission of a request signal Srq from the transmission antenna 27 and checks whether or not smart verification has been accomplished.

When a lid unlocking initiation condition is satisfied, the lock ECU 43 produces rotation in an unlock direction with the lock motor 29 and separates the lock pin 28 from the striker 20. The lid unlocking initiation condition is the accomplishment of smart verification when the lid 3 is pushed. When the lock pin 28 is separated from the engagement groove 21, the lid 3 is unlocked. This allows for the lid 3 to open. The unlocking of the lid 3 may be initiated in cooperation with, for example, the unlocking of the vehicle doors.

When the lid 3 opens, the operation switch 22 is moved to the OFF position. Thus, the operation switch 22 generates and provides the lock ECU 43 with an OFF position detection signal indicating that the operation switch 22 is located at the OFF position. When the lock ECU 43 receives the OFF position detection signal from the operation switch 22, the lock ECU 43 determines that the lid 3 is located at the open position and activates the lighting unit 8.

Charge Cable Locking Operation

Figure 8:
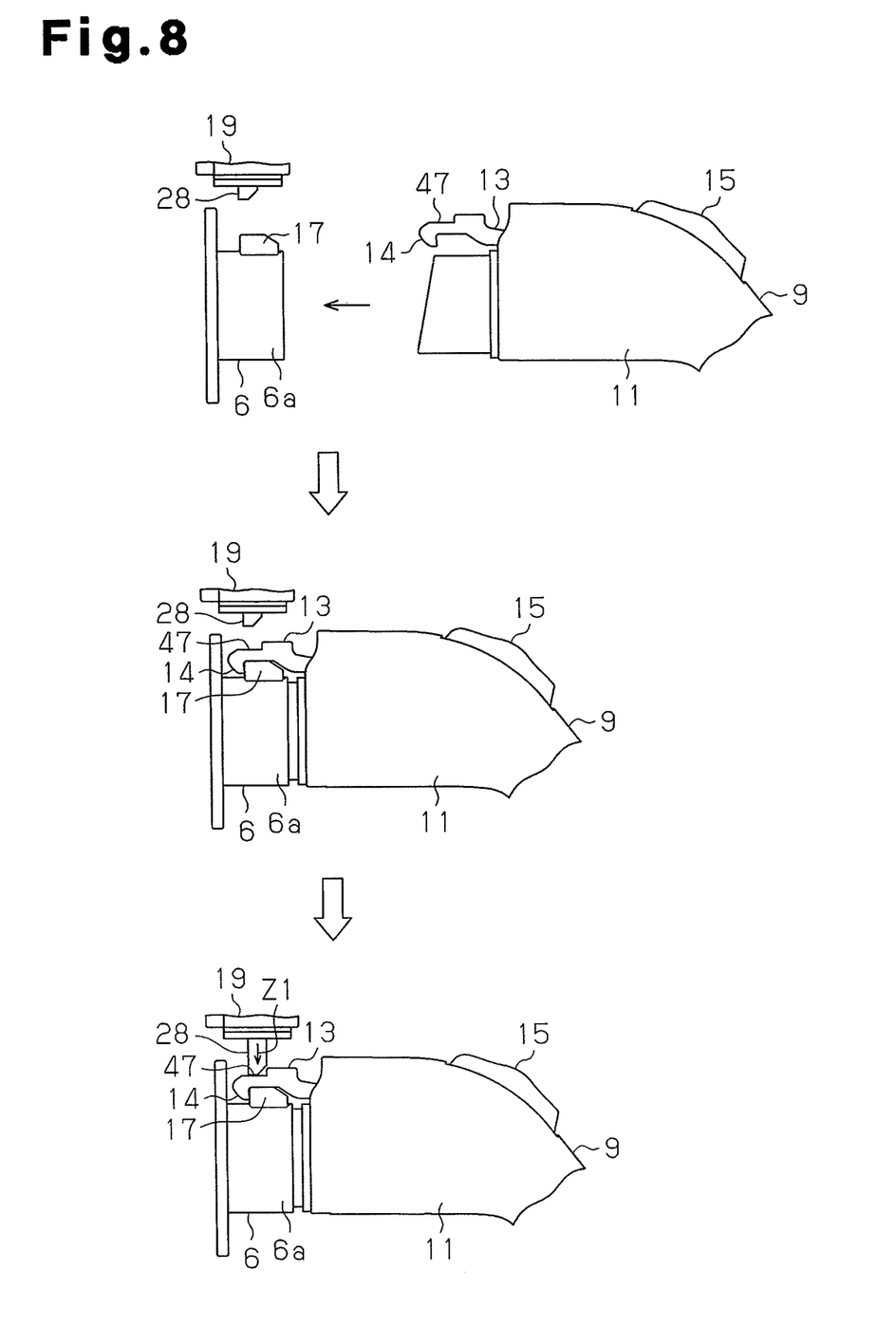
FIG. 8 is a schematic diagram illustrating the operation of the lock device when locking a charge cable.

Referring to FIG. 8, when the lid 3 is open, the lock pin 28 is located at the unlock position. This allows for the power plug 11 to be fitted to the inlet 6 to connect the charge cable 9 to the inlet 6. When the power plug 11 reaches the most inward position in the inlet 6, the hook 14 of the lock arm 13 is hooked to the catch 17 of the inlet 6.

After the user connects the charge cable 9 to the inlet 6, when a condition for initiating locking of the charge cable 9 is satisfied, current flows to the lock motor 29 so that the lock motor 29 produces rotation in the lock direction. When the lock pin 28 reaches the lock position, the lock pin 28 contacts an abutment surface 47 defined on an upper surface of the hook 14 of the lock arm 13. This restricts pivoting of the lock arm 13 from the abutment surface 47 and locks the charge cable 9. Thus, an unauthorized person cannot remove the charge cable 9 from the inlet 6.

The condition for initiating locking of the charge cable 9 may be, for example, a locking operation being performed on an operation switch dedicated for charge cable locking. The operation switch may be arranged in the power port 2 or in the vehicle. Another condition for initiating locking of the charge cable 9 may be, for example, a plug connection detection signal from the plug connection detector 18 of the power plug 11 being received by the vehicle body 1 when the vehicle doors are locked (door locking cooperation).

Charge Cable Unlocking Operation

Figure 9:
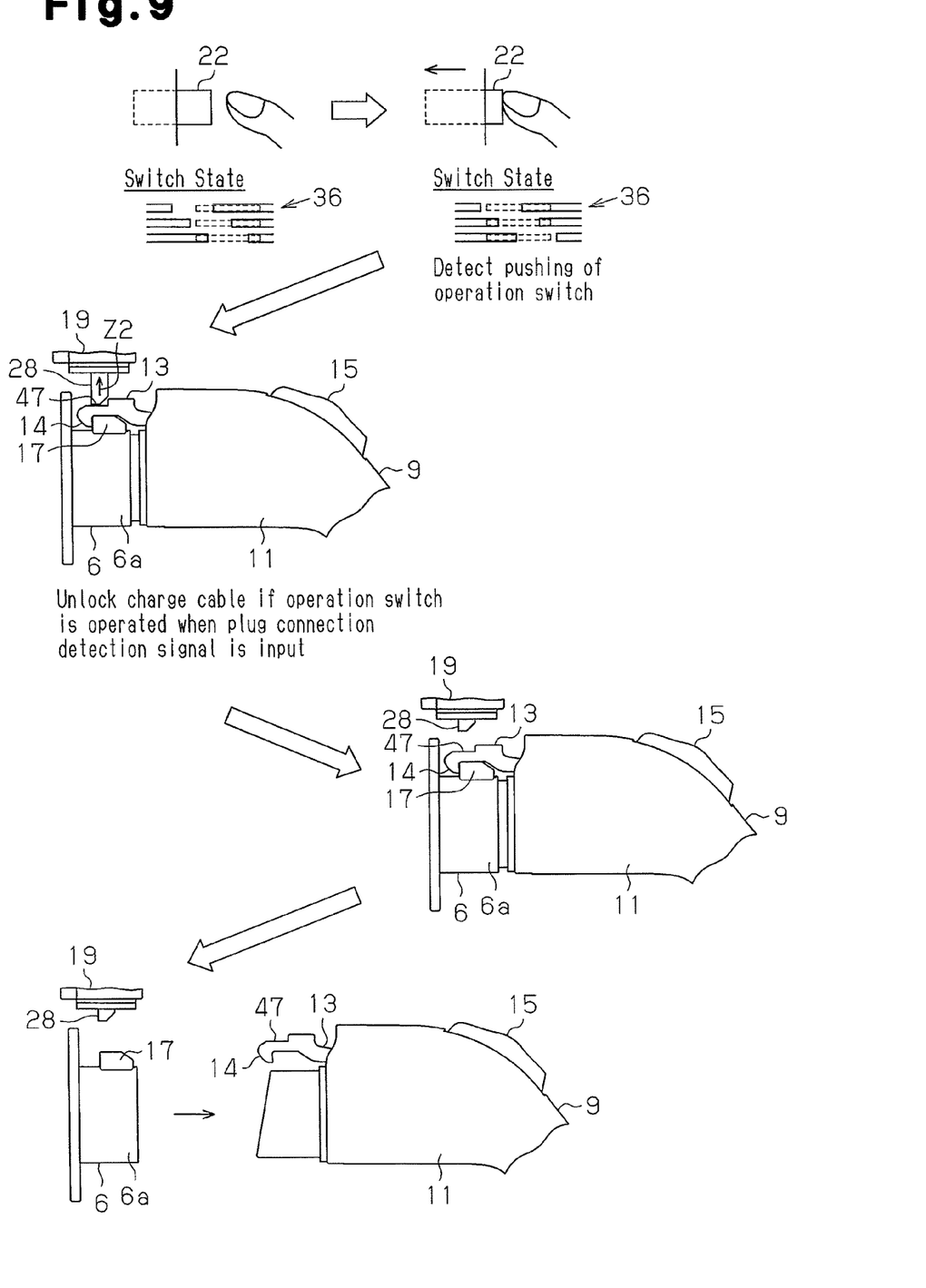
FIG. 9 is a schematic diagram illustrating the operation of the lock device when unlocking the charge cable.

Referring to FIG. 9, to unlock the charge cable 9, the user pushes the operation switch 22. This shifts the operation switch 22 from the OFF position to the first ON position. Thus, the operation switch 22 provides the lock ECU 43 with an OFF position detection signal and a first ON position detection signal in this order. When the lock ECU 43 receives the OFF position detection signal and the first ON position detection signal in this order, the lock ECU 43 determines that the operation switch 22 has been manually operated.

When conditions for initiating unlocking of the charge cable 9 is satisfied, the lock motor 29 produces rotation in the unlock direction and separates the lock pin 28 from the abutment surface 47 of the lock arm 13. The conditions for initiating unlocking of the charge cable 9 are the operation switch 22 being pushed and the lock ECU 43 receiving the plug connection detection signal from the plug connection detector 18. When the lock pin 28 is separated from the abutment surface 47, the charge cable 9 is unlocked. This unlocks the charge cable 9 and permits pivoting of the lock arm 13 from the abutment surface 47. Thus, the charge cable 9 is allowed to be removed from the inlet 6.

Lid Locking Operation

Figure 10:
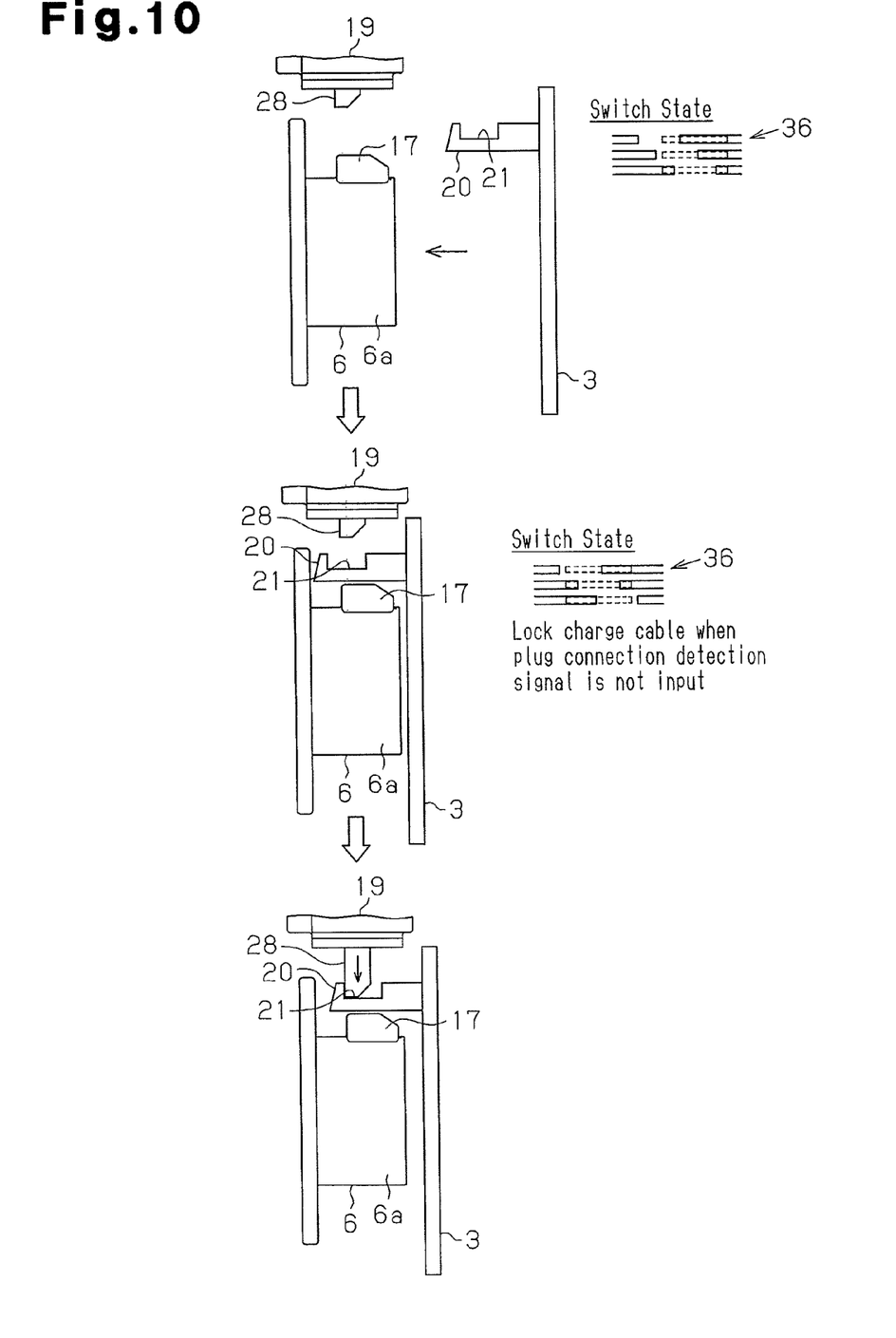
FIG. 10 is a schematic diagram illustrating the operation of the lock device when locking the lid.

Referring to FIG. 10, when the lid 3 is closed but unlocked, the engagement groove 21 of the striker 20 is located directly below the lock pin 28. When closing the lid 3, the operation switch 22 is shifted from the OFF position to the first ON position. Thus, the operation switch 22 provides the lock ECU 43 with the OFF position detection signal and the first ON position detection signal in this order. If the lock ECU 43 receives the OFF position detection signal and the first ON position detection signal in this order when a plug connection detection signal is not received, the lock ECU 43 determines that the lid 3 has been closed and deactivates the lighting unit 8. The lid 3 may also be determined as having been closed when detecting the first ON position and then the second ON position.

When conditions for initiating locking of the lid 3 is satisfied, the lock ECU 43 produces rotation in the lock direction with the lock motor 29 and engages the lock pin 28 with the engagement groove 21 of the striker 20. When the lid 3 is closed, the lid 3 may be locked in cooperation with the locking of the vehicle doors. Engagement of the lock pin 28 with the engagement groove 21 locks the lid 3 so that an unauthorized person cannot open the lid 3.

The present embodiment has the advantages described below.

(1) The lock device 19 includes the operation switch 22 capable of detecting a plurality of positions including a lid open position (OFF position), a lid close position (first ON position), and a push position (second ON position). The operation switch selectively generates a position detection signal that at least corresponds to one of the lid positions, namely, the open position, the close position, and the push position. Based on the detection signal from the operation switch 22, the lock ECU 43 allows for controlling of the lid locking, the charge cable locking, the lighting unit 8, the transmission antenna 27, and the like. In this manner, the same operation switch 22 may be used to detect the three positions. This reduces the space taken up by components and lowers costs. Further, the weight of the lock device 19 may be decreased, and the coupling of components may be simplified.

(2) The open or closed state of the lid 3, the closing of the lid 3, and an operation for initiating charge cable unlocking are distinguished by the same operation switch. This reduces the space taken up by components and lowers costs.

(3) When opening and closing the lid 3, the operation switch 22 is operated by the rear surface of the lid 3. When the lid 3 is located at the open position, the operation switch 22 may be manually operated. In addition to when opening and closing the lid 3, the operation switch 22 may be used as an input interface. This allows for the execution of a variety of controls.

(4) The same operation switch 22 may be used for lid locking and charge cable locking. Thus, separate switches for lid locking and charge cable locking are not necessary. This allows for the number of components to be reduced and costs to be lowered.

(5) If the operation switch 22 is shifted from the first ON position to the second ON position and then the first ON position, the lid 3 is unlocked when smart verification is accomplished or in cooperation with door unlocking. Thus, the user may open the lid 3 by pushing the lid 3 inward from the close position when smart verification is accomplished or in cooperation with door unlocking.

(6) When the charge cable 9 is connected to the inlet 6 and the operation switch 22 is shifted from the OFF position to the first ON position, the charge cable 9 is unlocked. In this manner, the charge cable 9 is unlocked when the operation switch 22 is operated by the user. This reduces unnecessary and unintentional unlocking of the charge cable 9.

(7) Charge cable locking and lid locking use the same lock pin 28, which is shifted by the lock motor 29 between the lock position and the unlock position. Thus, separate sets of the lock pin 28 and the lock motor 29 are not necessary for charge cable locking and lid locking. This allows for the lock device 19 to have a simple structure.

It should be apparent to those skilled in the art that the present invention may be embodied in many other specific forms without departing from the spirit or scope of the invention. Particularly, it should be understood that the present invention may be embodied in the following forms.

Figure 11:
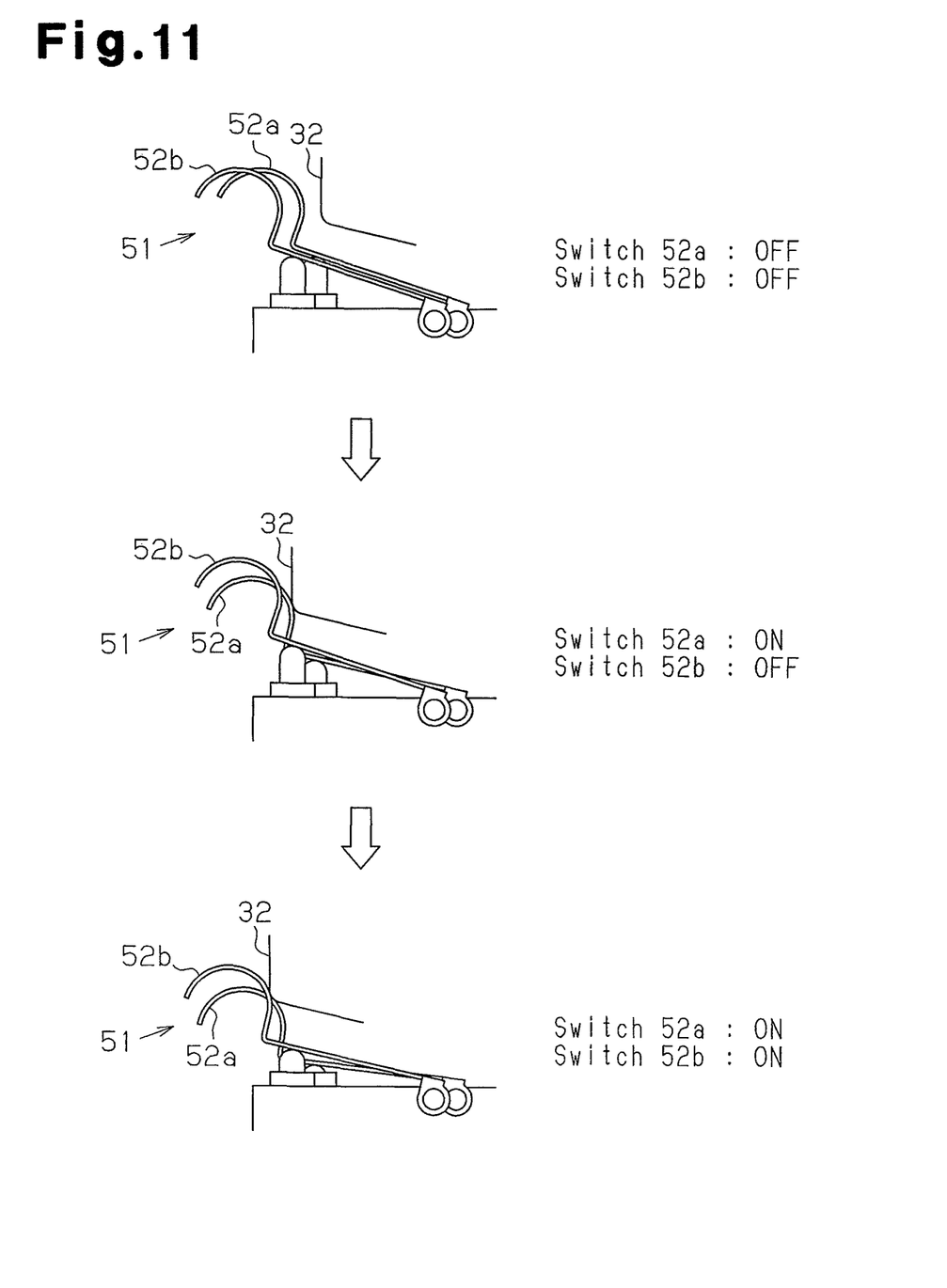
FIG. 11 is a schematic diagram illustrating the operation of an operation switch in a further example.

Referring to FIG. 11, the detector may be replaced by a microswitch 51. The microswitch 51 includes two switch units 52a and 52b that are sequentially activated by the movable link 32. When the button 23 is located at an OFF position, the two switch units 52a and 52b are deactivated. When the button 23 is located at a first ON position, the switch unit 52a is activated. When the button 23 is located at the second ON position, the two switch units 52a and 52b are activated. In this manner, three positions of the button 23 may be detected.

The electronic key system may be, for example, a wireless key system or a short-range wireless communication system. A wireless key system performs key verification through narrow-band wireless communication when communication is established with an electronic key. A short-range wireless communication system performs verification through bidirectional short-range wireless communication (communication distance of several centimeters to several tens of centimeters) and may be, for example, an immobilizer system or a near field communication (NFC) system.

The actuator of the lock device 19 may be, for example, a solenoid instead of a motor.

The plug connection detector 18 may be a switch or a sensor arranged in the inlet 6. Further, the plug connection detector 18 may include or not include a contact.

The lid 3 may be opened and closed by a push lifter instead of a torsion spring.

During lid locking, the lock pin 28 may be engaged with a component other than the striker 20.

The lock device 19 does not have to be arranged in the upper portion of the lid box 5 and may be arranged at other locations such as a side portion of the lid box 5.

The lock device 19 may be fastened together with the inlet 6 when coupled to the lid box 5 or coupled to the lid box 5 separately from the inlet 6.

The lock device 19 may be manually switched to a lock state or an unlock state by a user.

One of locking and unlocking with the lock device 19 may be performed manually, and the other one of locking and unlocking may be performed automatically.

The lock device 19 may be dedicated for charge cable locking or for lid locking. Further, in broad terms, the lock device 19 only needs to be arranged in the power port 2.

The locking subject does not have to be the lid 3 or the charge cable 9 and may be any component related with the power port 2 of a battery-powered vehicle.

The lock device 19 may have any structure as long as the lock pin 28 may be moved in the lock direction and the unlock direction. Further, the lock member does not have to be a movable pin and may be, for example, a pivotal cylindrical pin member including a cutout portion. In this case, the lock arm 13 is fixed by a location free from the cutout portion, and the cutout portion allows for operation of the lock arm 13. The lock member may be a triangular plate pivoted between a lock position and an unlock position.

In the lock device 19, an urging member may constantly urge the lock pin 28 in an unlocking direction or a locking direction.

The lock device 19 may be of a direct-connection type in which, for example, a projection and a sloped groove couples the lock pin 28 to a support, and the movement of the support guides the lock pin 28 with the projection and the sloped groove to the lock position and the unlock position.

The lock device 19 may directly engage the lock pin 28 with the housing (main body) of the power plug 11 to lock the charge cable 9.

The operation switch 22 may be arranged at a position where it is operable only by the lid 3 and may be used as a lid lock.

Instead of a contact switch, the detector may be a contactless sensor.

When the detector is a contactless sensor, the detector may be one of a variety of sensors such as an optical sensor or a magnetic sensor.

The lock device 19 does not have to be installed in a vehicle and may be applied to a different device or apparatus.

The following technical concepts may be recognized from the embodiment and examples described above.

If unlocking initiating conditions including operation of the detector to a push position are satisfied when the lid is locked, the control unit unlocks the lid. This structure unlocks the lid when, for example, the lid is pushed to the push position from the close position and allows for opening of the lid.

If the control unit detects that the detector has been operated to the close position or the push position when the charge cable is locked, the control unit locks or unlocks the charge cable. This structure unlocks the charge cable when, for example, the detector is manually operated to the close position or the push position from the open position and allows for the user to unlock the charge cable when the user wishes to do so. This reduces unnecessary and unintentional unlocking of the charge cable.

The lock device is of an integrated type (shared type) device that allows for selective locking of the charge cable and the lid with a single lock member. This structure allows for components to be shared and simplifies the structure of the device.

If the lid is locked when the control unit determines that the lid has been moved to the push position based on the position detection signal, the control unit unlocks the lid.

If the charge cable is locked when the control unit determines that the detector has been manually operated based on the position detection signal, the control unit unlocks the charge cable.

The present examples and embodiments are to be considered as illustrative and not restrictive, and the invention is not to be limited to the details given herein, but may be modified within the scope and equivalence of the appended claims.

The invention claimed is:

1. A lock device for locking or unlocking a locking subject that relates to a power port and includes a lid, the lock device comprising:
 a detector that selectively generates a position detection signal at least corresponding to one of an open position where the lid is open, a closed position where the lid is closed, and a push position where the lid is pushed from the closed position,
 wherein the detector includes:
  a first detector that detects whether or not the lid is located at the open position to generate a first position detection signal;
  a second detector that detects whether or not the lid is located at the closed position to generate a second position detection signal; and
  a third detector that detects whether or not the lid is located at the push position to generate a third position detection signal; and
 a controller that controls locking or unlocking of the locking subject and a related device of the locking subject based on the first position detection signal, the second position detection signal, and the third position detection signal from the detector.

2. The lock device according to claim 1, wherein the detector is configured so as to be operable by a rear surface of the lid when the lid opens and closes and to be manually operable when the lid is open.

3. The lock device according to claim 1, wherein the locking subject includes a charge cable, the lock device further comprising a cable connection detector that detects connection of the charge cable to the power port and generates a connection detection signal, and
 wherein, based on the first position detection signal, the second position detection signal, and the third position detection signal, and the connection detection signal, the controller distinguishes opening or closing of the lid, and the controller distinguishes locking or unlocking of the charge cable when the lid is open.

4. The lock device according to claim 1, wherein the first detector includes a first fixed contact and a first movable contact that slides on the first fixed contact, the first detector electrically connects the first fixed contact and the first movable contact to generate the first position detection signal indicating that the lid is located at the open position, when the lid is located at the open position,
 the second detector includes a second fixed contact and a second movable contact that slides on the second fixed contact, the second detector electrically connects the second fixed contact and the second movable contact to generate the second position detection signal indicating that the lid is located at the closed position, when the lid is located at the closed position, and
 the third detector includes a third fixed contact and a third movable contact that slides on the third fixed contact, the third detector electrically connects the third fixed contact and the third movable contact to generate the third position detection signal indicating that the lid is located at the push position, when the lid is located at the push position.

5. The lock device according to claim 1, wherein the related device of the locking subject includes a lighting unit or a transmission antenna.

6. The lock device according to claim 1, wherein the related device of the locking subject includes a lighting unit,
 the controller activates the lighting unit when receiving the second position detection signal indicating that the lid is located at the closed position, and
 the controller deactivates the lighting unit when receiving the third position detection signal indicating that the lid is located at the push position.

7. The lock device according to claim 1, wherein the related device of the locking subject includes a transmission antenna,
 the controller transmits a request signal for checking whether or not smart verification has been accomplished from the transmission antenna when receiving the second position detection signal indicating that the lid is located at the closed position, the third position detection signal indicating that the lid is located at the push position, and the second position detection signal again indicating that the lid is located at the closed position, in this order.

* * * * *